United States Patent [19]
Foti

[11] Patent Number: 5,711,002
[45] Date of Patent: Jan. 20, 1998

[54] TRANSFER-TO C-NUMBER MESSAGE TRIGGERING OF A ROUTING REQUEST MESSAGE WITHIN A CELLULAR TELEPHONE NETWORK

[75] Inventor: George Foti, Dollard Des Ormeaux, Canada

[73] Assignee: Telefonaktiebolaget LM Ericsson (Publ), Stockholm, Sweden

[21] Appl. No.: 648,352

[22] Filed: May 14, 1996

[51] Int. Cl.⁶ .................................... H04Q 7/38
[52] U.S. Cl. ................ 455/433; 455/417; 379/211
[58] Field of Search .................... 379/58, 59, 67, 379/88, 229, 60, 61, 62, 63, 69, 112, 128, 131, 119, 211; 455/33.1, 33.2, 34.1, 34.2, 417, 422, 433, 436, 450, 455

[56] References Cited

U.S. PATENT DOCUMENTS

| | | | |
|---|---|---|---|
| 5,168,517 | 12/1992 | Waldman | 379/211 |
| 5,243,645 | 9/1993 | Bissell et al. | 379/211 |
| 5,253,288 | 10/1993 | Frey et al. | 379/210 |
| 5,260,986 | 11/1993 | Pershan | 379/57 |
| 5,329,578 | 7/1994 | Brennan et al. | 379/59 |
| 5,400,390 | 3/1995 | Salin | |

Primary Examiner—Curtis A. Kuntz
Assistant Examiner—Binh K. Tieu
Attorney, Agent, or Firm—Jenkens & Gilchrist, P.C.

[57] ABSTRACT

Streamlined initiation of a call transfer within a cellular telephone network is effectuated by having the transfer-to C-number request include not only an identification of the B-number for the called mobile station, but also an identification number of a switching node presently handling the call. Responsive to receipt of this request, the home location register processes the B-number to identify one or more C-numbers for forwarding of the call. The home location register then determines which switching nodes currently serve the identified C-numbers and directly generates a routing request message, including the received present switching node identification number, to each of those switching nodes. This action bypasses the conventional TIA IS-41 signaling actions of returning the identified C-numbers to the present switching node and generating a location request message for delivery back to the home location register.

39 Claims, 10 Drawing Sheets

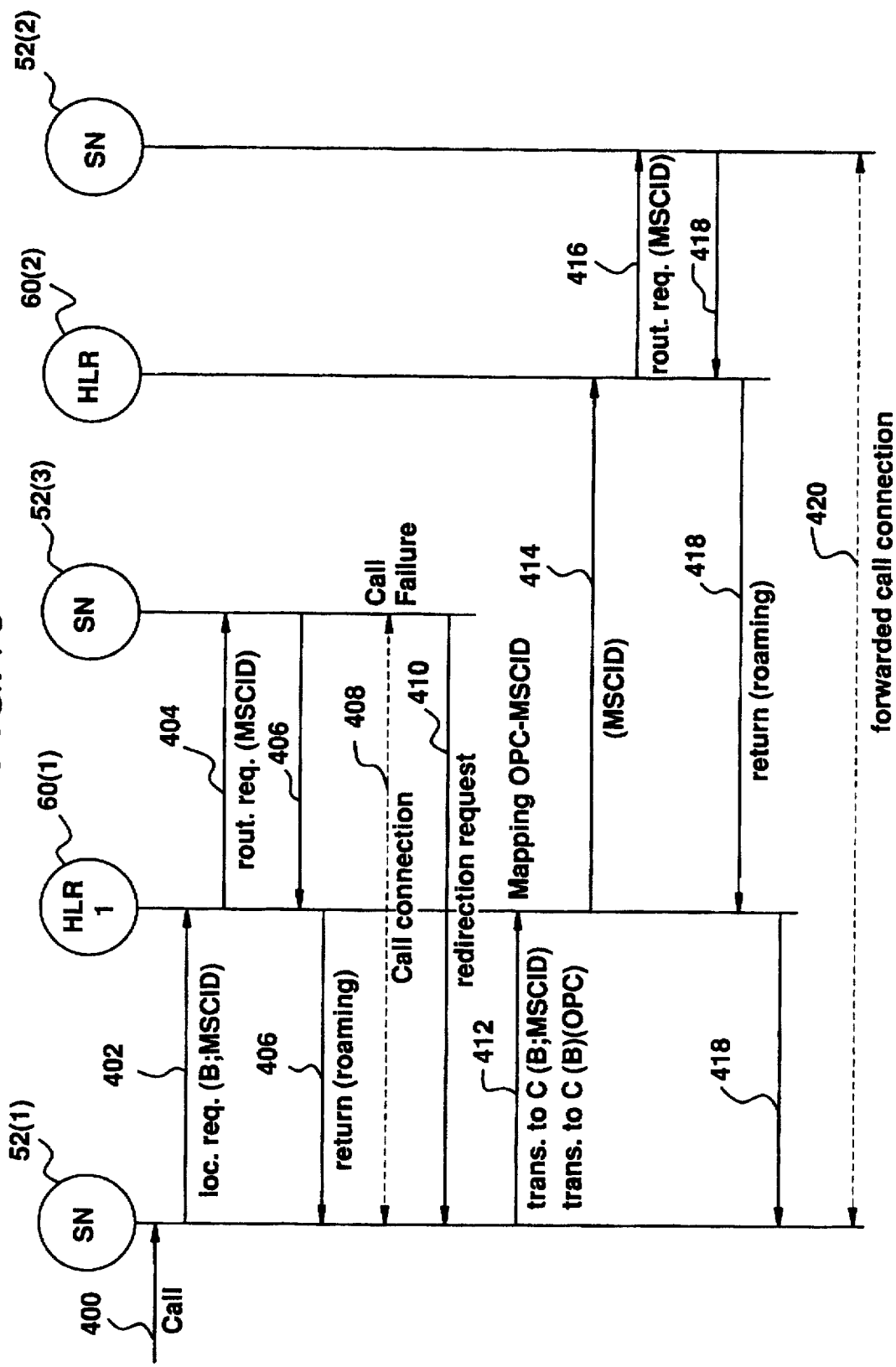

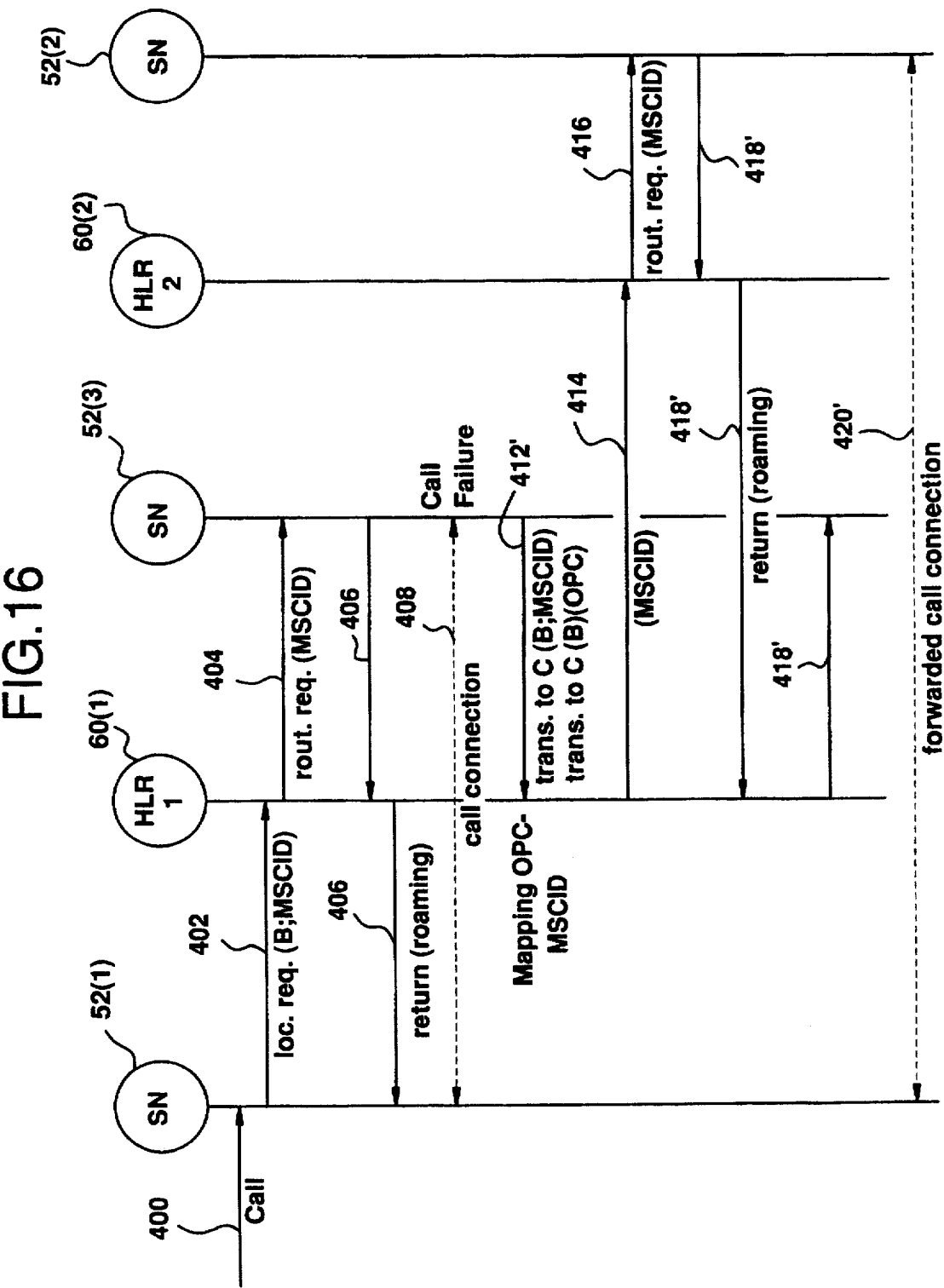

TRANSFER-TO C-NUMBER MESSAGE TRIGGERING OF A ROUTING REQUEST MESSAGE WITHIN A CELLULAR TELEPHONE NETWORK

BACKGROUND OF THE INVENTION

1. Technical Field of the Invention

The present invention relates to cellular telephone networks and, in particular, to the provision of call transfer services within a cellular telephone network.

2. Description of Related Art

Many cellular telephone networks now support a plurality of subscriber calling services which are made available to cellular subscribers. Examples of such subscriber calling services include call waiting, three-way calling, paging, voice mail, call forwarding and multi-leg calling (flexible alerting or mobile access hunting). The latter three such calling services comprise examples of call transfer services.

With respect to the examples of call transfer services, the voice mail service comprises the taking and storing for later subscriber retrieval of a voice message recorded in response to an incoming call made to that subscriber's telephone number. The call forwarding service comprises the transfer of an incoming call made to the subscriber's telephone number to another number specified by the subscriber. The multi-leg calling service comprises the calling of a plurality of subscriber specified numbers in either a simultaneous or sequential manner in response to an incoming call made to that subscriber's telephone number. Other types of call transfer services are known to those skilled in the art.

Operation of a cellular telephone network in accordance with TIA IS-41 signaling specifications to handle an incoming call dialed to a cellular subscriber is well known. Responsive to receipt at an originating switching node of the incoming call dialed to a mobile station, a location request including an identification of both the originating switching node and the dialed B-number is sent to the home location register for the dialed mobile station. The home location register processes the received B-number in its data base to identify a switching node currently serving the dialed mobile station. A routing request is then sent from the home location register to the serving switching node to pre-route delivery of the call. The serving switching node responds to the home location register with a roaming number, and this roaming number is forwarded to the originating switching node where it is used to establish a call connection between the originating switching node and the serving switching node to deliver the incoming call to the dialed mobile station.

In accordance with TIA IS-41 signaling specifications, activation of call transfer calling services may be made in response to the transmission of a redirection request from the serving switching node to the originating switching node (sent perhaps following a failure of the called subscriber to answer the incoming call). The originating switching node then sends a transfer-to C-number request including an identification of the dialed B-number to the home location register. The home location register processes the B-number of the transfer-to request in its data base to identify one or more subscriber specified C-numbers to which the incoming call is to be transferred. Each C-number is then returned to the originating switching node. Call set-up is further handled by performing number analysis in the home location register to determine the serving switching node, pre-routing of the call, returning of the roaming number, and establishment of a call connection with the serving switching node to deliver the call to the specified C-number.

The process specified in TIA IS-41 signaling after transmitting the transfer-to C-number request to the home location register for returning each individual C-number to the originating switching node and subsequent transmission back to the home location register of a location request is time consuming and inefficient. There is a need then for a modification of the TIA IS-41 signaling specification and the operation of the cellular telephone network to more efficiently process transfer-to C-number requests.

SUMMARY OF THE INVENTION

The present invention comprises a method and apparatus for more efficiently initiating a call transfer service within a cellular telephone network. Responsive to receipt in the originating switching node of a redirection request or responsive to another call transfer initiator at the serving switching node, a transfer-to C-number request is generated and sent to the B-number home location register for processing. The transfer-to C-number request includes not only an identification of the B-number for the called mobile station, but also an identification number for the switching node sending the request. Responsive to receipt of this request, the home location register processes the B-number to identify one or more C-numbers for forwarding of the call. The home location register then determines which switching nodes currently serve the identified C-numbers and directly generates a routing request message, including the identification number for the switching node received in the transfer-to C-number request, to each of those switching nodes. This action bypasses the conventional TIA IS-41 signaling actions of returning the identified C-numbers and generating a location request message for delivery back to the home location register. Accordingly, more efficient signaling and handling of the call transfer service is provided.

BRIEF DESCRIPTION OF THE DRAWINGS

A more complete understanding of the method and apparatus of the present invention may be acquired by reference to the following Detailed Description when taken in conjunction with the accompanying Drawings wherein:

FIG. 10 is a signal flow and node operation diagram for the example call handled as illustrated in FIG. 9;

FIG. 16 is a signal flow and node operation diagram for the example call handled as illustrated in FIG. 15.

DETAILED DESCRIPTION OF THE DRAWINGS

Figure 1:
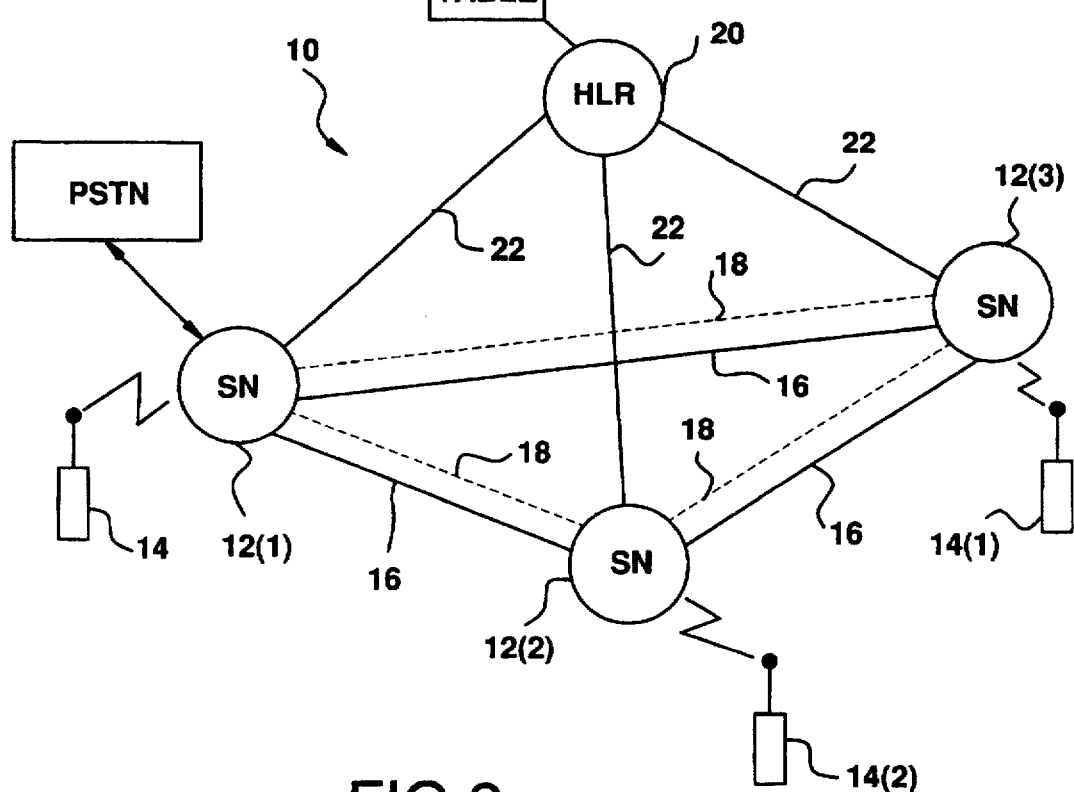
FIG. 1 is a schematic diagram of a cellular telephone network.

Reference is now made to FIG. 1 wherein there is shown a simplified schematic diagram of a cellular telephone network 10 including a plurality of interconnected switching nodes (SN) 12. Although only three switching nodes 12 are shown, it will be understood that the network 10 likely includes many more interconnected nodes. The switching nodes 12 may comprise any one of a number of known telecommunications switching devices, including those commonly used and known in the art for providing either digital or analog cellular telephone service to a plurality of mobile station subscribers 14. The switching nodes 12 are interconnected for communication via both signaling links 16 (illustrated with solid lines) and voice trunks 18 (illustrated with broken lines). The voice trunks 18 provide voice and data communications paths used to carry subscriber communications between the nodes 12. The signaling links 16 carry command signals between the nodes 12 used for setting up and tearing down voice and data communications links over the voice trunks 18, and for controlling the provision of special subscriber calling service features to the mobile station subscribers 14.

The switching nodes 12 are connected to a data base 20 (or perhaps to plural data bases if necessary) comprising, for example, a home location register (HLR), by means of signaling links 22. The data base (s) 20 store information concerning the mobile station subscribers 14 comprising location information and service information. In particular, the data base 20 store subscriber telephone numbers related to an identification of certain calling service features to which the mobile station subscribers associated with the telephone numbers are entitled to use. Such calling service features may include call waiting, three-way calling, paging, voice mail, call forwarding and multi-leg calling (flexible alerting or mobile access hunting).

Figure 2:
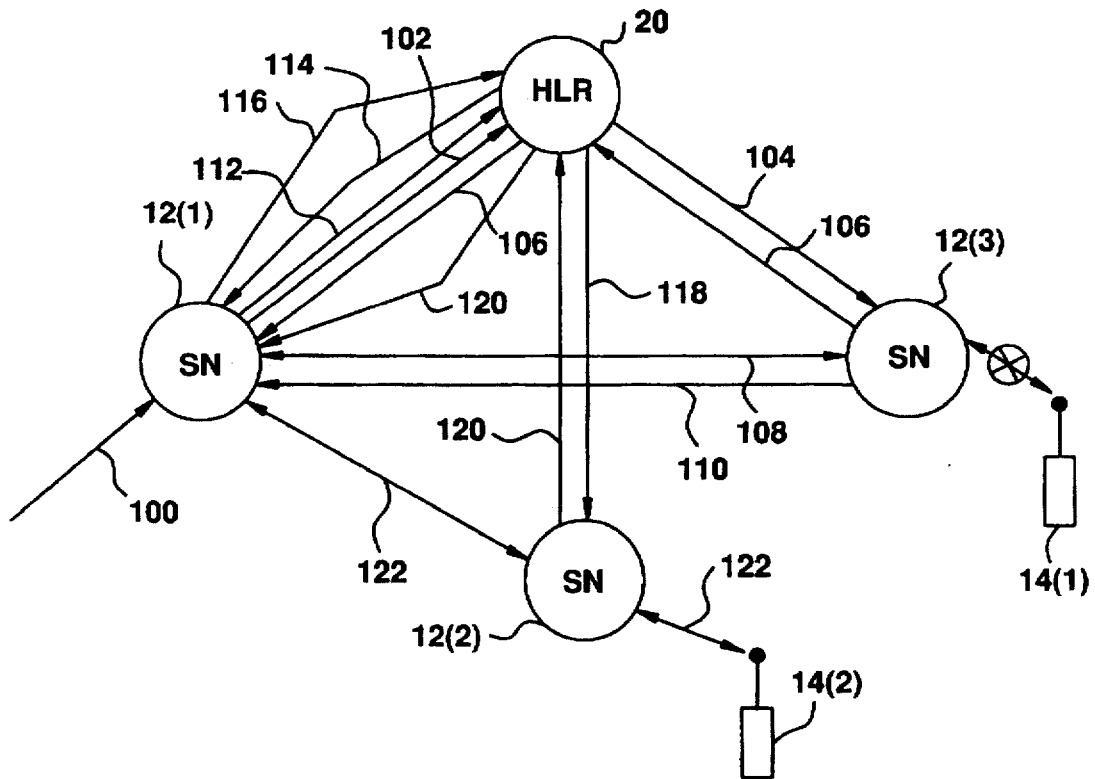
FIG. 2 is a schematic diagram of a cellular telephone network illustrating the flow of signals in connection with the prior art handling of an example call and the initiation of a transfer-to calling service.
Figure 3:
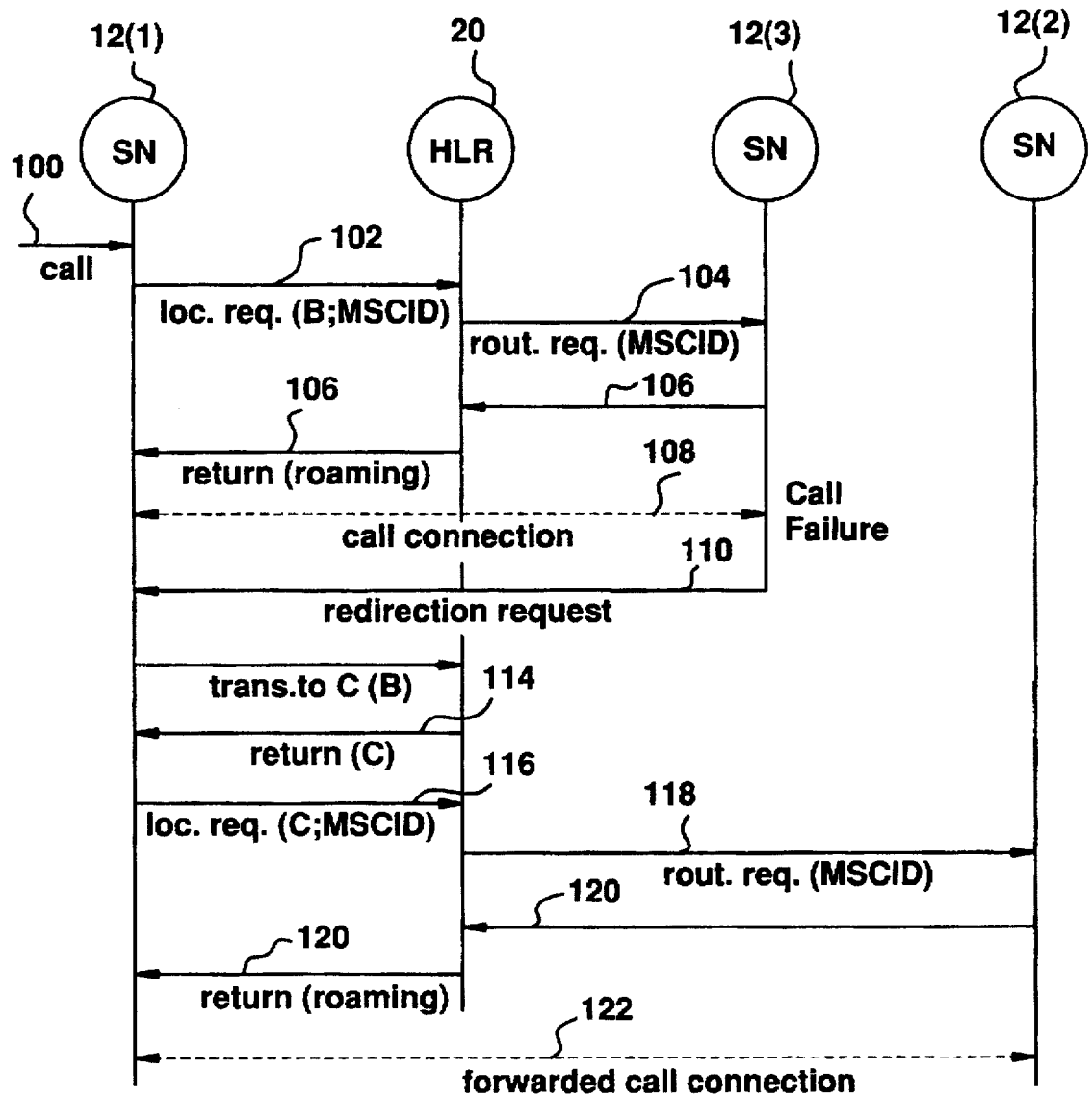
FIG. 3 is a signal flow and node operation diagram for the example call handled as illustrated in FIG. 2 in accordance with the prior art.

Reference is now made in combination to FIGS. 1, 2 and 3. FIG. 2 is a schematic diagram of the cellular telephone network 10 illustrating the flow of signals in connection with a specific example of the prior art handling of a call and the initiation of a transfer-to calling service. FIG. 3 is a signal flow and node operation diagram for the example call handled as illustrated in FIG. 2 in accordance with the prior art.

A call 100 dialed to the B-number of mobile station 14(1) originates from another cellular subscriber or the (public switched telephone network) PSTN and is received at the originating switching node 12(1). Using the signaling link 22, the originating switching node 12(1) interrogates the home location register data base 20 with a location request 102 including the dialed B-number and an identification number for the originating switching node (MSCID). The location request 102 and its parameters are processed by the home location register data base 20 to determine the location (i.e., serving switching node 12(3)) within the cellular network 10 of the called mobile station subscriber 14(1). Responsive to this interrogation, the data base 20 signals the serving switching node 12(3) for the called mobile station subscriber 14(1) over signaling link 22 with a routing request 104 to pre-route the call. Importantly, the routing request 104 includes as one of its parameters the identification number for the originating switching node 12(1) as provided in the location request 102. Responsive to the signal 104, the serving switching node 12(3) returns 106 a temporary location (roaming) directory routing number (and associated parameters) for the called mobile station subscriber to the originating switching node 12(1) via the home location register data base 20. The incoming call is then delivered (through connected) 108 over the voice trunk 18 to the serving switching node 12(3) for attempted completion to the called mobile station subscriber 14(1).

Assume now that the attempted call completion to the called mobile station subscriber 14(1) fails. This may occur, for example, due to a failure of the subscriber to answer. It is also assumed that the mobile station subscriber 14(1) is subscripted to a call transfer calling service such as call forwarding on no reply. At this point, the serving switching node 12(3) signals the originating switching node 12(1) over signaling link 16 with a re-direction request 110 for the call. The originating switching node 12(1) then transmits a transfer-to C-number request 112 over signaling link 22 to the home location register data base 20. The request 112 includes the dialed B-number as one of its parameters. The data base 20 then processes the B-number to retrieve one or more C-numbers specified by the subscriber for call transfer. Each identified C-number is then returned 114 to the originating switching node 12(1) for further processing.

A similar procedure to that described above with respect to the original call handling and the processing of the B-number is then performed with respect to each returned C-number until a call completion is accomplished. The originating switching node 12(1) interrogates the home location register data base 20 with a location request 116 including the returned C-number of mobile station subscriber 14(2) and an identification number for the originating switching node. The location request 116 and its parameters are processed by the home location register data base 20 to determine the location (i.e., serving switching node 12(2)) within the cellular network 10 of the transfer-to mobile station subscriber 14(2). Responsive to this interrogation, the data base 20 signals the serving switching node 12(2) for the mobile station subscriber 14(2) over signaling link 22 with a routing request 118 to pre-route the call. The routing request 118 includes as one of its parameters the identification number for the originating switching node 12(1) as provided in the location request 116. Responsive to the request 118, the serving switching node 12(2) returns 120 a temporary location directory routing number (and associated parameters) for the transfer-to mobile station subscriber to the originating switching node 12(1) via the home location register data base 20. The incoming call is then delivered (through connected) 122 over the voice trunk 18 to the serving switching node 12(2) for attempted completion to the transfer-to mobile station subscriber 14(2).

It will be recognized from the foregoing discussion and a review of FIGS. 2 and 3 that the transfer-to calling operation in accordance with the current TIA IS-41 signaling specification requires the return 114 of individual C-numbers to the originating switching node 12(1) and the generation by that node of a location request 116 to initiate forwarded (or transfer) call set-up. Such signaling is time consuming and inefficient, especially when the subscriber has specified a plurality of C-numbers for transfer-to handling. There accordingly would be an advantage with respect to time of call processing and efficiency of call handling if the required signaling in call transfer operations could be streamlined.

Figure 4:
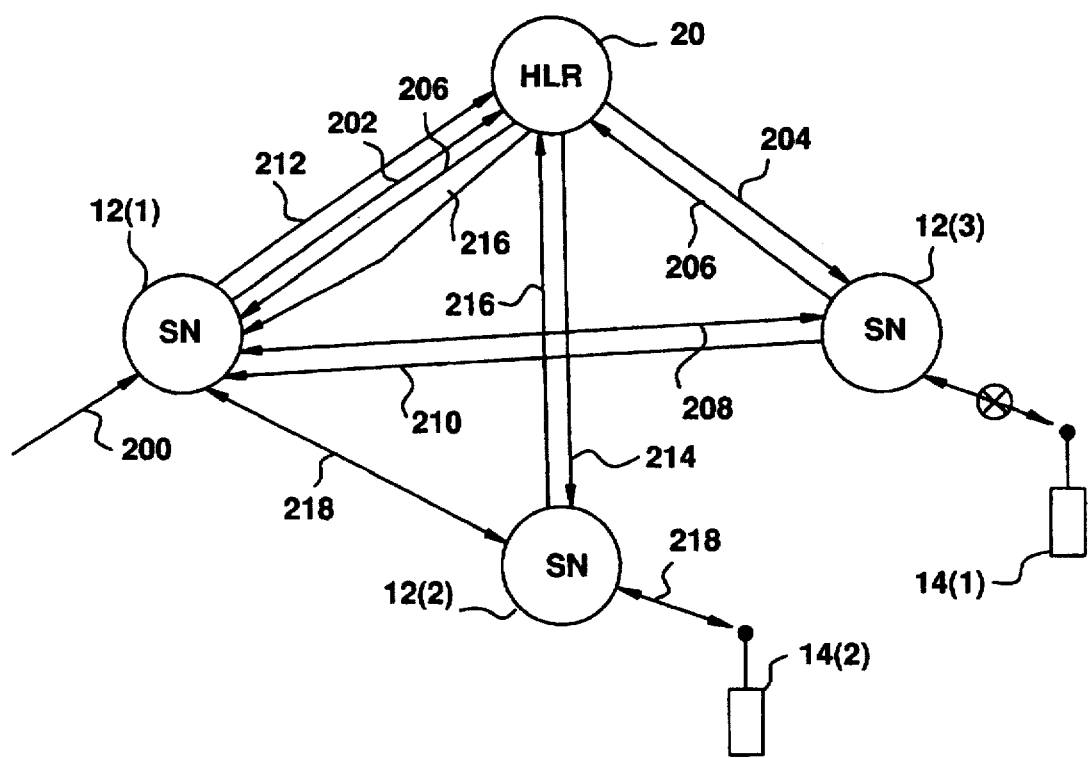
FIG. 4 is a schematic diagram of a cellular telephone network illustrating the flow of signals in connection with the handling of an example call and the initiation of a transfer-to calling service in accordance with the present invention.
Figure 5:
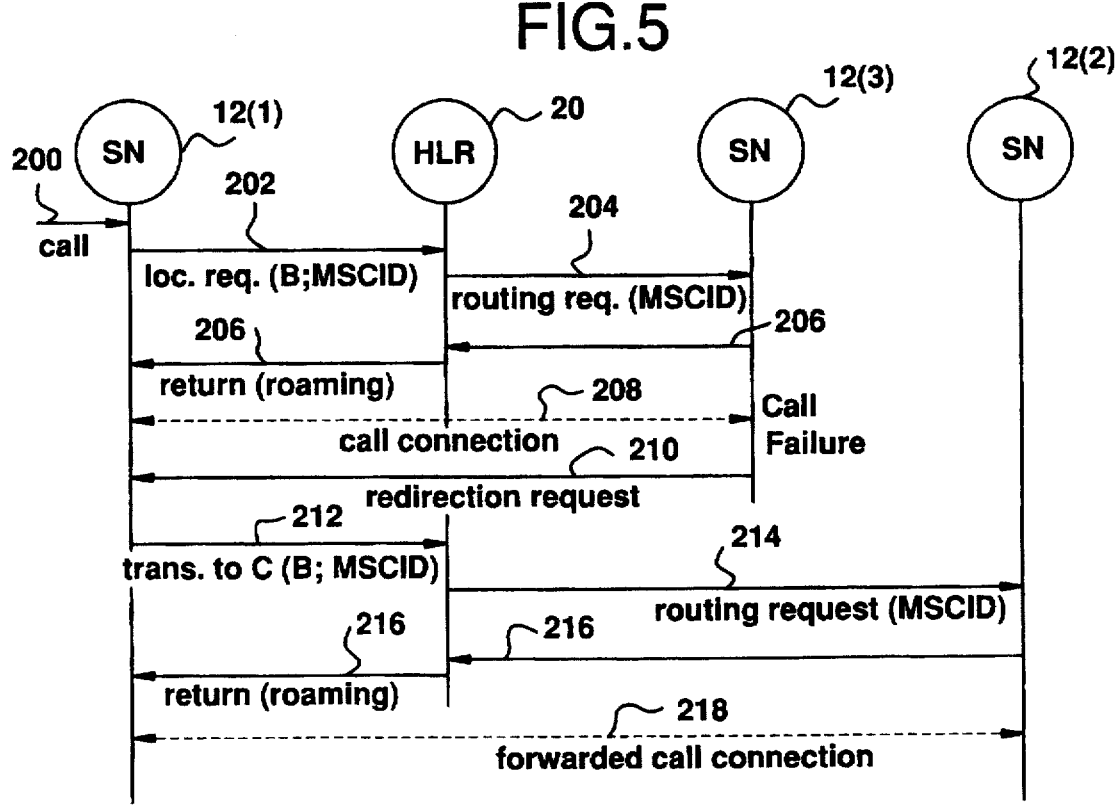
FIG. 5 is a signal flow and node operation diagram for the example call handled as illustrated in FIG. 4.

Reference is now made in combination to FIGS. 1, 4 and 5. FIG. 4 is a schematic diagram of the cellular telephone network 10 illustrating the flow of signals in connection with a specific example of the handling of a call and the initiation of a transfer-to calling service in accordance with the present invention. FIG. 5 is a signal flow and node operation diagram for the example call handled as illustrated in FIG. 4.

A call 200 dialed to the B-number of mobile station 14(1) originates from another cellular subscriber or the PSTN and is received at the originating switching node 12(1). Using the signaling link 22, the originating switching node 12(1) interrogates the home location register data base 20 with a location request 202 including the dialed B-number and an identification number for the originating switching node. The location request 202 and its parameters are processed by the home location register data base 20 to determine the location (i.e., serving switching node 12(3)) within the cellular network 10 of the called mobile station subscriber 14(1). Responsive to this interrogation, the data base 20 signals the serving switching node 12(3) for the called mobile station subscriber 14(1) over signaling link 22 with a routing request 204 to pre-route the call. Importantly, the routing request 204 includes as one of its parameters the identification number for the originating switching node 12(1) as provided in the location request 202. Responsive to the signal 204, the serving switching node 12(3) returns 206 a temporary location directory routing number (and associated parameters) for the called mobile station subscriber 14(1) to the originating switching node 12(1) via the home location register data base 20. The incoming call is then delivered (through connected) 208 over the voice trunk 18 to the serving switching node 12(3) for attempted completion to the called mobile station subscriber 14(1).

Assume now that the attempted call completion to the called mobile station subscriber 14(1) fails. This may occur, for example, due to a failure of the subscriber to answer,. It is also assumed that the mobile station subscriber 14(1) is subscripted to a call transfer calling service such as call forwarding on no reply. At this point, the serving switching node 12(3) signals the originating switching node 12(1) over signaling link 16 with a re-direction request 210 for the call. The originating switching node 12(1) then transmits a transfer-to C-number request 212 over signaling link 22 to the home location register data base 20. The request 212 includes not only the dialed B-number as one of its parameters (in accordance with the current TIA IS-41 signaling specification) but also the identification number for the originating switching node 12(1). The data base 20 then processes the B-number to retrieve one or more C-numbers specified by the subscriber for call transfer. Each identified C-number is further processed by the home location register data base 20 to determine the location (i.e., serving switching node 12(2)) within the cellular network 10 of the transfer-to mobile station subscriber 14(2). The data base 20 then signals the serving switching node 12(2) for the mobile station subscriber 14(2) over signaling link 22 with a routing request 214 to pre-route the call. The request 214 includes the identification number for the originating switching node 12(1) provided through the additional identification parameter included in the transfer-to C-number request 212. The serving switching node 12(2) then returns 216 a temporary location directory routing number (and associated parameters) for the transfer-to mobile station subscriber to the originating switching node 12(1) via the home location register data base 20. The incoming call is then delivered (through connected) 218 over the voice trunk 18 to the serving switching node 12(2) for attempted completion to the transfer-to mobile station subscriber 14(2).

It will be recognized from the foregoing discussion and a review of FIGS. 4 and 5 in comparison with FIGS. 2 and 3 that no forwarding (return 114) of the identified C-numbers from the home location register data base 20 to the originating switching node 12(1), and no issuance of a location request (signal 116) back to the home location register data base is made in accordance with the present invention. As was noted above, the routing requests (signals 104, 118, 204 and 214) issued by the home location register data base 20 during call set-up each must include as one of its parameters an identification number for the originating switching node 12(1). This identification information is obtained in accordance with conventional TIA IS-41 signaling (see, FIGS. 2 and 3) from the received location request (signals 102, 116 and 202). Streamlining in the present invention of the required call transfer signaling by eliminating use of the return 114 and location request 116 is accomplished in FIGS. 4 and 5 by having the transfer-to C-number request 212 include not only a parameter for the B-number as specified in TIA IS-41 signaling, but also a new, additional parameter for the identification number for the originating switching node 12(1). This added identification parameter is then advantageously utilized by the home location register data base 20 to by-pass further communication with the originating switching node 12(1) and immediately generate routing requests 214 to pre-route transfer-to calls for each identified C-number.

Figure 6:
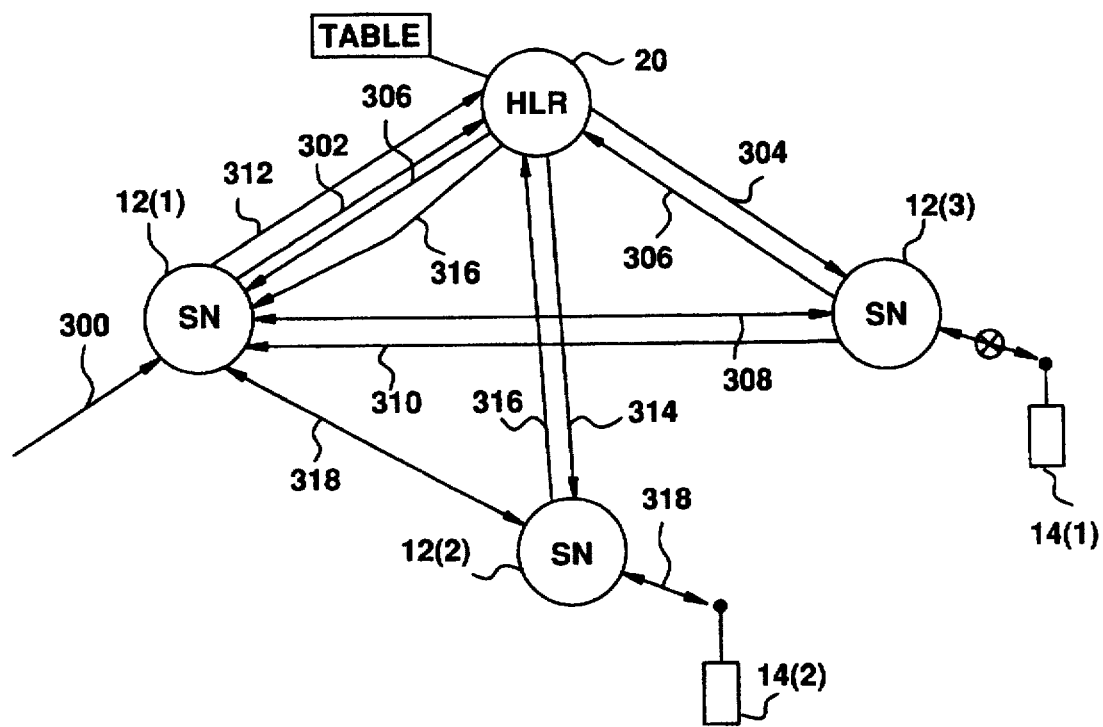
FIG. 6 is a schematic diagram of a cellular telephone network illustrating the flow of signals in connection with the handling of an example call and the initiation of a transfer-to calling service in accordance with an alternative embodiment of the present invention.
Figure 7:
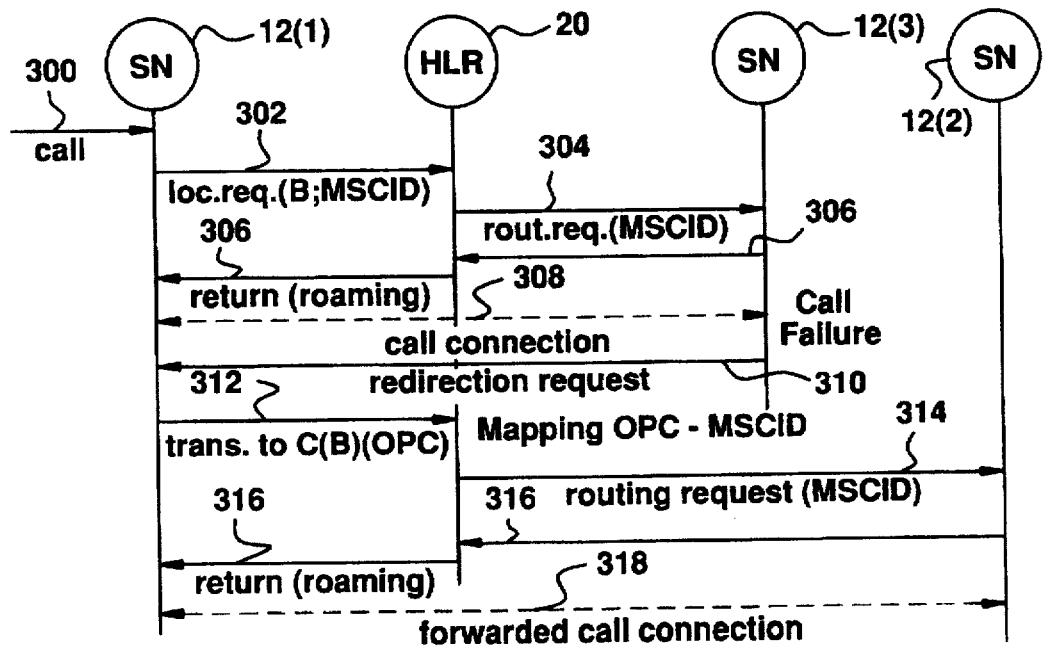
FIG. 7 is a signal flow and node operation diagram for the example call handled as illustrated in FIG. 6.

Reference is now made in combination to FIGS. 1, 6 and 7. FIG. 6 is a schematic diagram of the cellular telephone network 10 illustrating the flow of signals in connection with a specific example of the handling of a call and the initiation of a transfer-to calling service in accordance with an alternative embodiment of the present invention. FIG. 7 is a signal flow and node operation diagram for the example call handled as illustrated in FIG. 6.

A call 300 dialed to the B-number of mobile station 14(1) originates from another cellular subscriber or the PSTN and is received at the originating switching node 12(1). Using the signaling link 22, the originating switching node 12(1) interrogates the home location register data base 20 with a location request 302 including the dialed B-number and an identification number for the originating switching node. The location request 302 and its parameters are processed by the home location register data base 20 to determine the location (i.e., serving switching node 12(3)) within the cellular network 10 of the called mobile station subscriber 14(1). Responsive to this interrogation, the data base 20 signals the serving switching node 12(3) for the called mobile station subscriber 14(1) over signaling link 22 with a routing request 304 to pre-route the call. Importantly, the routing request 304 includes as one of its parameters the identification number for the originating switching node 12(1) as provided in the location request 302. Responsive to the signal 304, the serving switching node 12(3) returns 306 a temporary location directory routing number (and associated parameters) for the called mobile station subscriber to the originating switching node 12(1) via the home location register data base 20. The incoming call is then delivered (through connected) 308 over the voice trunk 18 to the serving switching node 12(3) for attempted completion to the called mobile station subscriber 14(1).

Assume now that the attempted call completion to the called mobile station subscriber 14(1) fails. This may occur, for example, due to a failure of the subscriber to answer. It is also assumed that the mobile station subscriber 14(1) is subscripted to a call transfer calling service such as call forwarding on no reply. At this point, the serving switching node 12(3) signals the originating switching node 12(1) over signaling link 16 with a re-direction request 310 for the call. The originating switching node 12(1) then transmits a transfer-to C-number request 312 over signaling link 22 to the home location register data base 20. The request 312 includes the dialed B-number as one of its parameters.

It is well known to those skilled in the art that the signals transmitted between the nodes of the network 10 each include an origination point code(OPC) identifying the origin of the signal and a destination point code(DPC) identifying the destination of the message. These codes are used by the network 10 to route signals between the network nodes. For the request 312, for example, the origination point code identifies the originating switching node 12(1), and the destination point code identifies the home location register data base 20.

Responsive to receipt of the request 312, the data base 20 processes the B-number to retrieve one or more C-numbers specified by the subscriber for call transfer. Each identified C-number is further processed by the home location register data base 20 to determine the location (i.e., serving switching node 12(2)) within the cellular network 10 of the transfer-to mobile station subscriber 14(2). The home location register data base 20 also extracts and processes the origination point code for the request 312 to determine an identification number for the originating switching node 12(1). This determination is made by processing the origination point code in a look-up table (TABLE) which maps origination point codes for network nodes to identification numbers for those nodes. The data base 20 next signals the serving switching node 12(2) for the mobile station subscriber 14(2) over signaling link 22 with a routing request 314 to pre-route the call. The request 314 includes the identification number of the originating switching node 12(1) provided through the extraction and processing of the origination point code for the transfer-to C-number request 312. The serving switching node 12(2) then returns 316 a temporary location directory routing number (and associated parameters) for the transfer-to mobile station subscriber to the originating switching node 12(1) via the home location register data base 20. The incoming call is then delivered (through connected) 318 over the voice trunk 18 to the serving switching node 12(2) for attempted completion to the transfer-to mobile station subscriber 14(2).

Again, it will be recognized from the foregoing discussion and a review of FIGS. 6 and 7 in comparison with FIGS. 2 and 3 that no forwarding (return 114) of the identified C-numbers from the home location register data base 20 to the originating switching node 12(1), and no issuance of a location request (signal 116) back to the home location register data base is made in accordance with the present invention. Streamlining in the present invention of the required signaling by eliminating the return 114 and location request 116 is accomplished in FIGS. 6 and 7 by having the origination point code for the transfer-to C-number request 312 processed to determine an identification number of the originating switching node 12(1) for insertion as a parameter in the routing request (signal 314) issued by the home location register data base 20 during transfer-to call set-up. The determination and use of the identification number parameter advantageously allows the home location register data base 20 to by-pass further communication with the originating switching node 12(1) and immediately generate routing requests 314 to pre-route transfer-to calls for each identified C-number.

Figure 8:
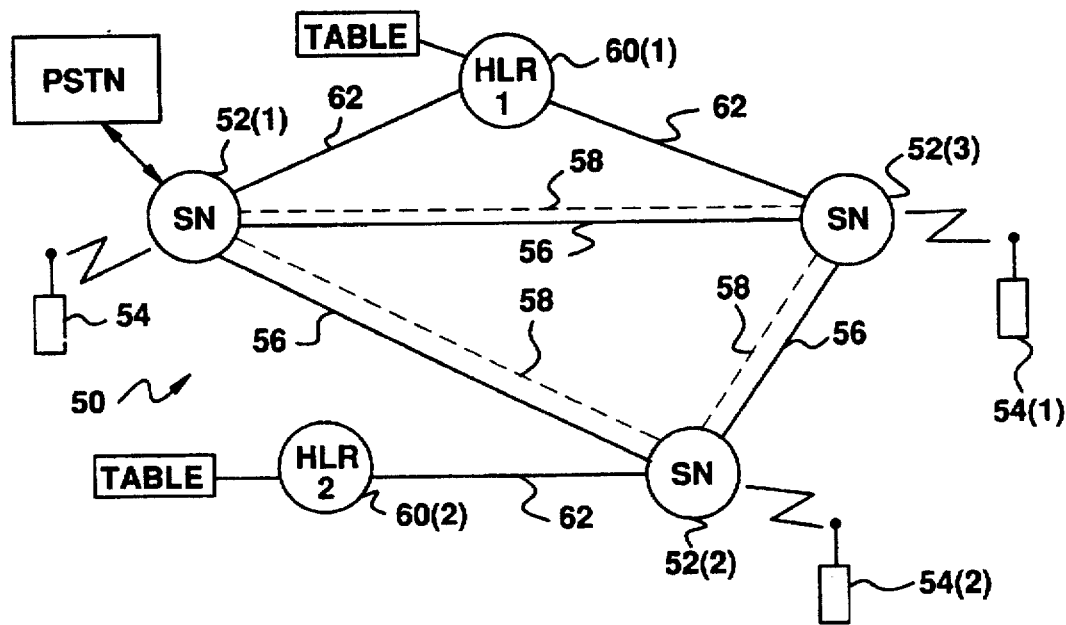
FIG. 8 is a schematic diagram of a cellular telephone network including plural home location registers.

Reference is now made to FIG. 8 wherein there is shown a simplified schematic diagram of a cellular telephone network 50 including a plurality of interconnected switching nodes (SN) 52. Although only three switching nodes 52 are shown, it will be understood that the network 50 likely includes many more interconnected nodes. The switching nodes 52 may comprise any one of a number of known telecommunications switching devices, including those commonly used and known in the art for providing either digital or analog cellular telephone service to a plurality of mobile station subscribers 54. The switching nodes 52 are interconnected for communication via both signaling links 56 (illustrated with solid lines) and voice trunks 58 (illustrated with broken lines). The voice trunks 58 provide voice and data communications paths used to carry subscriber communications between the nodes 52. The signaling links 56 carry command signals between the nodes 52 used for setting up and tearing down voice and data communications links over the voice trunks 58, and for controlling the provision of special subscriber calling service features to the mobile station subscribers 54.

Two of the switching nodes 52(1) and 52(3) are connected to a first data base 60(1) comprising, for example, a home location register (HLR), by means of signaling links 62. The remaining switching node 52(2) is connected to a second home location register data base 60(2) also by signaling links 62. The data bases 60 store information concerning the mobile station subscribers 54 comprising location information and service information. In particular, the data bases 60 store subscriber telephone numbers related to an identification of certain calling service features to which the mobile station subscribers associated with the telephone numbers are entitled to use. Such calling service features may include call waiting, three-way calling, paging, voice mail, call forwarding and multi-leg calling (flexible alerting or mobile access hunting). In particular, the first home location register 60(1) stores subscriber information for its own subscribers as well as information on which local home location register (like register 60(2)) stores information for other local subscribers. Likewise, the second home location register 60(2) stores subscriber information on its own subscribers and information on which local home location register (like register 60(1)) stores information on other local subscribers.

Figure 9:
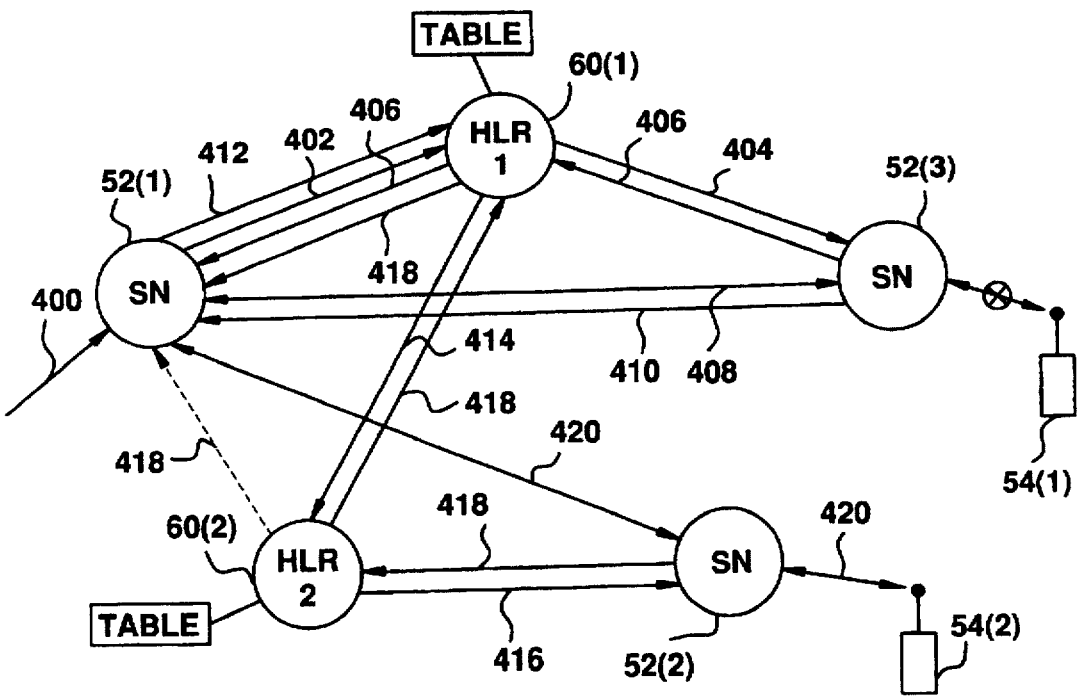
FIG. 9 is a schematic diagram of a cellular telephone network illustrating the flow of signals in connection with the handling of an example call and the initiation of a transfer-to calling service in accordance with yet another alternative embodiment of the present invention.

Reference is now made in combination to FIGS. 8, 9 and 10. FIG. 9 is a schematic diagram of the cellular telephone network 50 illustrating the flow of signals in connection with a specific example of the handling of a call and the initiation of a transfer-to calling service in accordance with yet another alternative embodiment of the present invention. FIG. 10 is a signal flow and node operation diagram for the example call handled as illustrated in FIG. 9.

A call 400 dialed to the B-number of mobile station 54(1) originates from another cellular subscriber or the PSTN and is received at the originating switching node 52(1). Using the signaling link 62, the originating switching node 52(1) interrogates the first home location register data base 60(1) with a location request 402 including the dialed B-number and an identification number for the originating switching node. The location request 402 and its parameters are processed by the first home location register data base 60(1) to determine the location (i.e., serving switching node 52(3)) within the cellular network 50 of the called mobile station subscriber 54(1). Responsive to this interrogation, the data base 60(1) signals the serving switching node 52(3) for the called mobile station subscriber 54(1) over signaling link 62 with a routing request 404 to pre-route the call. Importantly, the routing request 404 includes as one of its parameters the identification number for the originating switching node 52(1) as provided in the location request 402. Responsive to the signal 404, the serving switching node 52(3) returns 406 a temporary location directory routing number (and associated parameters) for the called mobile station subscriber to the originating switching node 52(1) via the first home location register data base 60(1). The incoming call is then delivered (through connected) 408 over the voice trunk 58 to the serving switching node 52(3) for attempted completion to the called mobile station subscriber 54(1).

Assume now that the attempted call completion to the called mobile station subscriber 54(1) fails. This may occur, for example, due to a failure of the subscriber to answer. It is also assumed that the mobile station subscriber 54(1) is subscripted to a call transfer calling service such as call forwarding on no reply. At this point, the serving switching node 52(3) signals the originating switching node 52(1) over signaling link 56 with a re-direction request 410 for the call. The originating switching node 52(1) then transmits a transfer-to C-number request 412 over signaling link 62 to the first home location register data base 60(1). The request 412 includes the dialed B-number as one of its parameters and identifies the originating switching node 52(1) through either a separate parameter (see also, FIGS. 4 and 5) or its origination point code (see also, FIGS. 6 and 7). Responsive to receipt of the request 412, the first data base 60(1) processes the B-number to retrieve one or more C-numbers specified by the subscriber for call transfer and determines an identification number for the originating switching node. In this example, at least one of the retrieved C-numbers is determined by the home location register from the stored subscriber and home location register information to be assigned to the second home location register data base 60(2) instead of the first home location register data base 60(1). Handling of the transfer-to call operation with respect to those C-numbers assigned to the first data base 60(1) is accomplished in the manner described above and illustrated in FIGS. 1 and 4–7.

With respect to the transfer-to operation for the C-number assigned to the second home location register data base 60(2), however, two options are available. First, in accordance with the prior art methods, the C-number may be returned to the originating switching node and further processed in the manner described above and illustrated in FIGS. 2 and 3. Alternatively, and in accordance with yet another alternative embodiment of the present invention, the identified C-number is processed in the second home location register data base 60(2) to effectuate call set-up and by-pass originating switching node 52(1) processing.

A signal 414 including both the identified C-number and an identification number for the originating switching node 52(1) is accordingly transmitted from the first home location register data base 60(1) to the second home location register data base 60(2). Responsive to receipt of the signal 414, the second data base 60(2) processes the identified C-number to determine the location (i.e., serving switching node 52(2)) within the cellular network 50 of the transfer-to mobile station subscriber 54(2). The second home location register data base 60(2) further extracts the identification number for the originating switching node 52(1) and signals the serving switching node 52(2) for the mobile station subscriber 54(2) over signaling link 62 with a routing request 416 to pre-route the call. The request 416 includes both the identification number of the originating switching node 52(1) and the identified C-number. The serving switching node 52(2) then returns 418 a temporary location directory routing number (and associated parameters) for the transfer-to mobile station subscriber to the originating switching node 52(1) via both the first and second home location register data bases 60. The incoming call is then delivered (through connected) 420 over the voice trunk 58 to the serving switching node 52(2) for attempted completion to the transfer-to mobile station subscriber 54(2).

Again, it will be recognized from the forgoing discussion and a review of FIGS. 9 and 10 in comparison with FIGS. 2 and 3 that no forwarding (return 114) of the identified C-numbers from the home location register data base 20 to the originating switching node 12(1), and no issuance of a location request (signal 116) back to the home location register data base is made in accordance with the present invention. Streamlining in the present invention of the required signaling by eliminating the return 114 and location request 116 is accomplished in FIGS. 9 and 10 by processing the transfer-to C-number request 412 to determine an identification number of the originating switching node 52(1) for insertion as a parameter in the routing request (signal 416) issued by the second home location register data base 60(2) during transfer-to call set-up. The determination and use of the identification parameter advantageously allows the second home location register data base 60(2) to by-pass further communication with the originating switching node 52(1) and immediately generate routing requests 416 to pre-route transfer-to calls for the identified C-numbers.

Reference is now made also to FIGS. 11–16 wherein like or similar reference numbers refer to like or similar elements. The transfer-to C-number request message 212, 312 or 412 of the present invention need not be generated by the originating switching node 12(1) and triggered in response to a received redirection request 210, 310 or 410 as shown in FIGS. 4–7 and 9–10. Rather, as illustrated in FIGS. 11–16, the transfer-to C-number request message 212', 312' and 412' of the present invention may be generated by the serving switching node 12(3) and triggered in response to any one of a number of known call transfer initiators.

Figure 11:
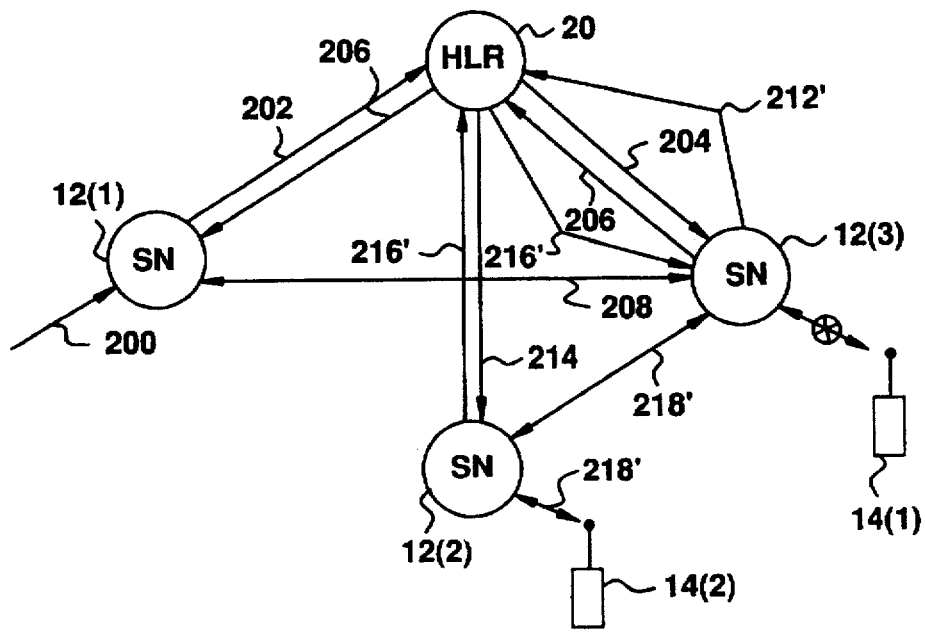
FIG. 11 is a schematic diagram of a cellular telephone network illustrating the flow of signals in connection with the handling of an example call and the initiation of a transfer-to calling service in accordance with still another alternative embodiment of the present invention.
Figure 12:
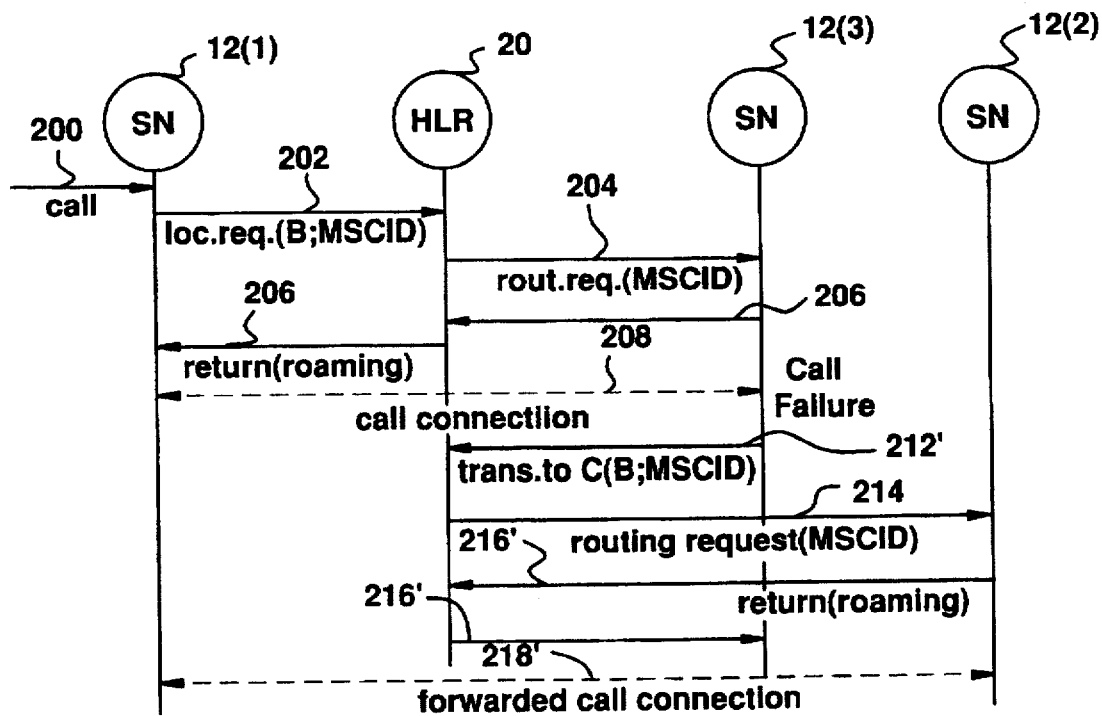
FIG. 12 is a signal flow and node operation diagram for the example call handled as illustrated in FIG. 11.

FIGS. 11 and 12 correspond in general to the embodiment of the invention illustrated in FIGS. 4 and 5, except that no redirection request 210 is generated, and instead the serving switching node 12(3) responds to a call transfer initiator by generating the transfer-to C-number request 212' for transmission over the signaling link 22 to the home location register data base 20. Again, the transfer-to C-number request 212' includes not only the dialed B-number as one of its parameters, but also the identification number for the switching node 12(3). Following processing of the B-number and the transmission of the routing request message 214 to the switching node 12(2) to pre-route the call, the temporary location directory routing number for the transfer-to mobile station subscriber is returned 216' to the switching node 12(3) via the home location register 20. The call is then delivered (through connected) 218' over the voice trunks 18 to the switching node 12(2) for attempted completion to the transfer-to mobile station subscriber 14(2).

Figure 13:
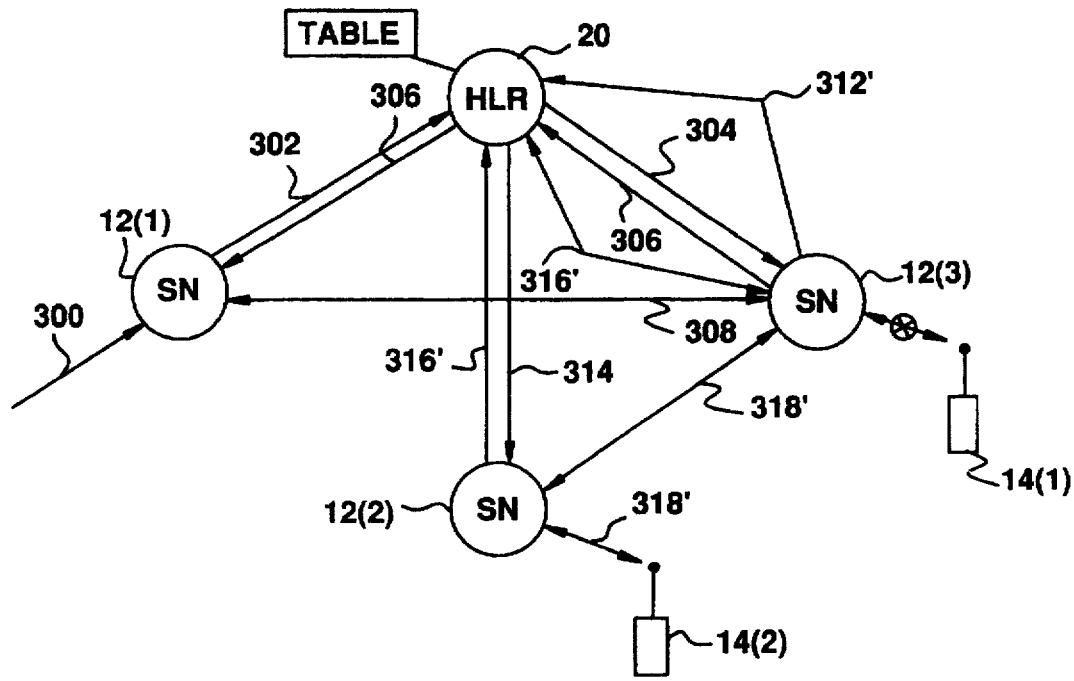
FIG. 13 is a schematic diagram of a cellular telephone network illustrating the flow of signals in connection with the handling of an example call and the initiation of a transfer-to calling service in accordance with yet another alternative embodiment of the present invention.
Figure 14:
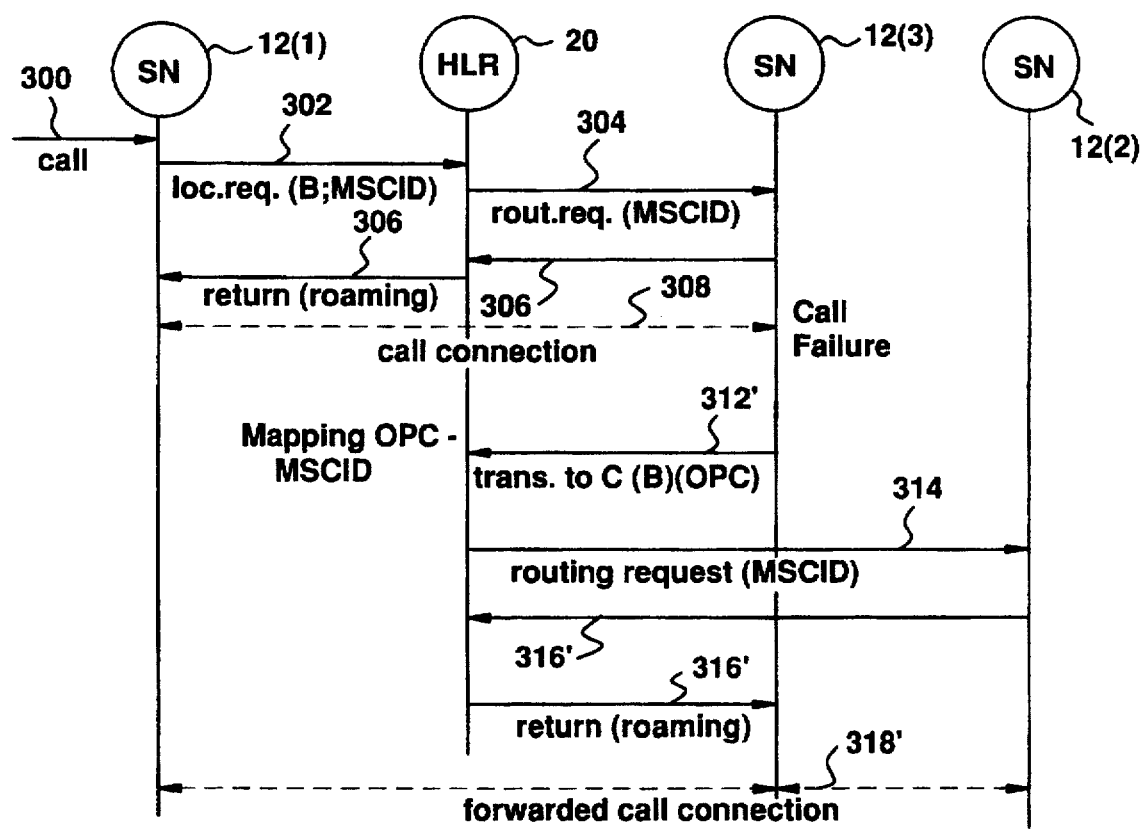
FIG. 14 is a signal flow and node operation diagram for the example call handled as illustrated in FIG. 13.

FIGS. 13 and 14 correspond in general to the embodiment of the invention illustrated in FIGS. 6 and 7, except that no redirection request 310 is generated, and instead the serving switching node 12(3) responds to a call transfer initiator by generating the transfer-to C-number request 312' for transmission over the signaling link 22 to the home location register data base 20. Again, the transfer-to C-number request 312' includes the dialed B-number as one of its parameters, and also includes an origination point code for the switching node 12(3). Following processing of the B-number, the processing (i.e., mapping) of the origination point code in the table to obtain an identification number for the switching node 12(3), and the transmission of the routing request message 314 to the switching node 12(2) to pre-route the call, the temporary location directory routing number for the transfer-to mobile station subscriber is returned 316' to the switching node 12(3) via the home location register 20. The call is then delivered (through connected) 318' over the voice trunks 18 to the switching node 12(2) for attempted completion to the transfer-to mobile station subscriber 14(2).

Figure 15:
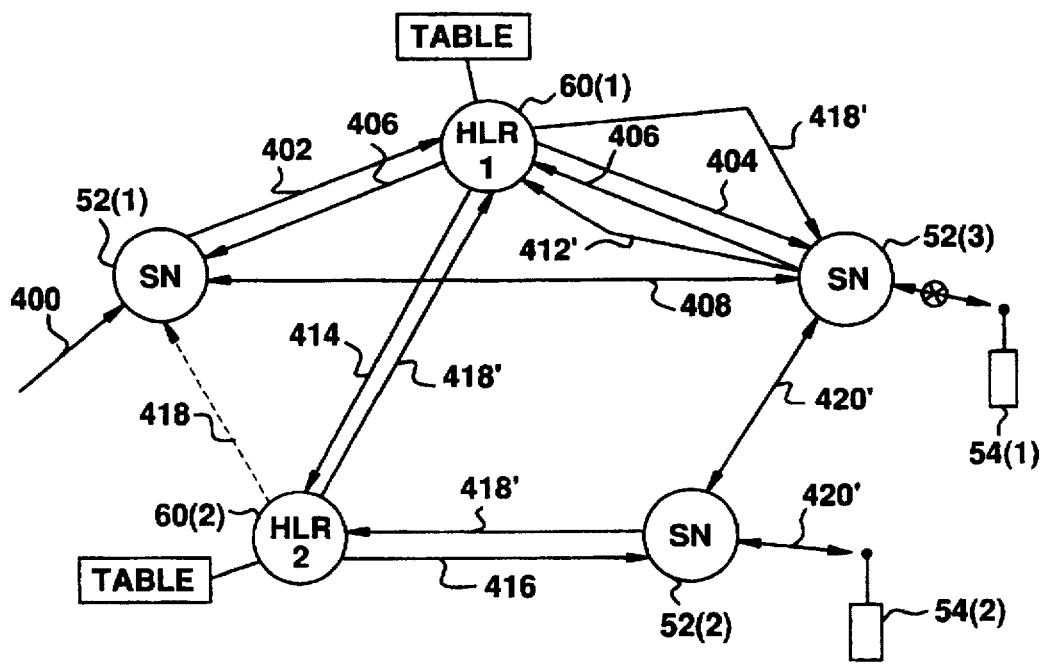
FIG. 15 is a schematic diagram of a cellular telephone network illustrating the flow of signals in connection with the handling of an example call and the initiation of a transfer-to calling service in accordance with still another alternative embodiment of the present invention.

FIGS. 15 and 16 correspond in general to the embodiment of the invention illustrated in FIGS. 9 and 10, except that no redirection request 410 is generated, and instead the serving switching node 52(3) responds to a call transfer initiator by generating the transfer-to C-number request 412' for transmission over the signaling link 62 to the home location register data base 60(1). Again, the transfer-to C-number request 412' includes not only the dialed B-number as one of its parameters, but also includes either a parameter comprising the identification number for the switching node 52(3) or an origination point code from which the identification number may be determined as described above. In this case, at least one of the C-numbers retrieved from the first home location register data base 60(1) is assigned to the second home location registers data base 60(2). For C-numbers assigned to the first home location register 60(1), transfer of the call is accomplished in the manner described above with respect to FIGS. 11-14. For C-numbers assigned to the second home location register data base 60(2), however, the signal 414 is transmitted from the first home location register 60(1) and processed to identify the serving switching node 52(2) for the mobile station subscriber 54(2). Following processing of the B-number and the transmission of the routing request message 416 to the switching node 52(2) to pre-route the call, the temporary location directory routing number for the transfer-to mobile station subscriber is returned 418' to the switching node 52(3) via the home location registers 60. The call is then delivered (through connected) 420' over the voice trunks 58 to the switching node 52(2) for attempted completion to the transfer-to mobile station subscriber 54(2).

The foregoing are examples of scenarios for handling a forwarded transfer-to call. It will, of course, be understood that the foregoing examples are not necessarily limitations on the operation of the present invention. Other scenarios and applications are possible and will be apparent to one skilled in the art in view of the disclosure. In particular, although illustrated in connection with a forwarding of a call following failure, the present invention is applicable to any call transfer operation. Furthermore, although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. In a cellular telephone network including a present switching node handling a call dialed to a B-number, a home location register storing transfer-to C-numbers for the dialed B-number, and a serving switching node serving a certain one of the C-numbers, a method for effectuating a call transfer set-up for the call, comprising the steps of:

responsive to a redirection initiator for the call, transmitting a transfer-to C-number request from the present switching node to the home location register, the transfer-to C-number request including the B-number and an identification number for the present switching node;

processing in the home location register of the B-number to retrieve the certain C-number;

processing in the home location register of the certain C-number, without having previously returned the C-number to the present switching node no determine the serving switching node; and transmitting a routing request from the home location register co the serving switching node to pro-route the call for transfer to the C-number, the routing requesting including the identification number for the present switching node as provided in the transfer-to C-number request.

2. The method of claim 1 wherein the transfer-to C-number request comprises a signal including parameters for the present switching node identification number as well as the B-number.

3. The method of claim 1 further including the steps of:

returning a roaming number for the serving switching node back to the present switching node in response to the pre-routing of the call; and establishing a transfer call connection between the present switching node and the serving switching node to transfer the call to the certain C-number.

4. The method of claim 1 wherein the present switching node comprises an originating switching node for the call.

5. The method of claim 1 wherein the present switching node comprises a switching node serving the dialed B-number.

6. The method of claim 1 wherein the redirection initiator comprises a redirection request transmitted responsive to failure of the call to the B-number.

7. In a cellular telephone network including a present switching node handling a call dialed to a B-number, a home location register storing transfer-to C-numbers for the dialed B-number, and a serving switching node serving a certain one of the C-numbers, a method for effectuating a call transfer set-up for the call, comprising the steps responsive to a redirection initiator for the call, transmitting a transfer-to C-number request from the present switching node to the home location register, the transfer-to C-number request including the B-number and an origination point code for the present switching node;

processing in the home location register of the B-number to retrieve the certain C-number;

proceeding in the home location register of the origination point code to determine an identification number for the present switching node;

processing in the home location register of the certain C-number, without having previously returned the C-number to the present switching node, to determine the serving switching node; and transmitting a routing request from the home location register to the serving switching node to pre-route the call for transfer to the C-number, the routing requesting including the identification number for the present switching node as determined from the processing of the origination point code for the transfer-to C-number request.

8. The method of claim 7 wherein the transfer-to C-number request comprises a signal including a parameter for the B-number.

9. The method of claim 7 further including the steps of:

returning a roaming number for the serving switching node back to the present switching node in response to the pre-routing of the call; and establishing a transfer call connection between the present switching node and the serving switching node to transfer the call to the certain C-number.

10. The method of claim 7 wherein the step of processing the origination point code comprises the step of mapping the origination point code to its associated present switching node identification number.

11. The method of claim 7 wherein the present switching node comprises an originating switching node for the call.

12. The method of claim 7 wherein the present switching node comprises a switching node serving the dialed B-number.

13. The method of claim 7 wherein the redirection initiator comprises a redirection request transmitted responsive to failure of the call to the B-number.

14. In a cellular telephone network including a present switching node for a call dialed to a B-number, a first home location register storing transfer-to C-numbers for the dialed B-number, a serving switching node serving a certain one of the C-numbers, and a second home location register to which the certain C-number is assigned, a method for effectuating a call transfer set-up for the call, comprising the steps of:

responsive to a redirection initiator for the call, transmitting a transfer-to C-number request from the present switching node to the first home location register, the transfer-to C-number request including an identification of both the B-number and the present switching node;

processing in the first home location register of the B-number to retrieve the certain C-number and determine an identification number for the present switching node;

transmitting a signal from the first home location register to the second home location register, the signal including the certain C-number and the identification number for the present switching node;

processing in the second home location register of the certain C-number to determine the serving switching node; and transmitting a routing request from the second home location register to the serving switching node to pre-route the call for transfer to the C-number, the routing requesting including the identification number for the present switching node.

15. The method of claim 14 wherein the transfer-to C-number request comprises a signal including a parameter for the B-number and an origination point code.

16. The method as in claim 15 wherein the step of processing in the first home location register comprises the step of mapping the origination point code to its associated present switching node identification number.

17. The method of claim 15 wherein the transfer-to C-number request comprises a signal including parameters for the present switching node identification number as well as the B-number.

18. The method of claim 14 further including the steps of:

returning a roaming number for the serving switching node back to the present switching node in response to the pre-routing of the call; and establishing a transfer call connection between the present switching node and the serving switching node to transfer the call to the certain C-number.

19. The method of claim 14 wherein the present switching node comprises an originating switching node for the call.

20. The method of claim 14 wherein the present switching node comprises a switching node serving the dialed B-number.

21. The method of claim 14 wherein the redirection initiator comprises a redirection request transmitted responsive to failure of the call to the B-number.

22. A cellular telephone network, comprising:

a present switching node handling a call dialed to a B-number, the present switching node generating, responsive to a redirection initiator for the call, a transfer-to C-number request including both the B-number and an identification number for the present switching node;

a home location register storing transfer-to C-numbers for the dialed B-number and connected to receive the transfer to c-number request from the present switching node, the home location register processing the B-number to retrieve a certain one of the C-numbers for call transfer and generating a routing request, without having previously returned the C-number to the present switching node, including both the C-number and the identification number for the present switching node from the received transfer-to C-number request; and a serving switching node serving the certain C-number and having network connections with both the present switching node and the home location register, the serving switching node generating, in response to the routing request, a return signal for transmission to the present switching node identifying the serving switching node for transfer of the call to the C-number.

23. The network of claim 22 wherein the transfer-to C-number request comprises a signal including parameters for the present switching node identification number as well as the B-number.

24. The network of claim 22 wherein the present switching node comprises an originating switching node for the call.

25. The network of claim 22 wherein the present switching node comprises a switching node serving the dialed B-number.

26. The network of claim 22 wherein the redirection initiator comprises a redirection request transmitted responsive to failure of the call to the B-number.

27. A cellular telephone network, comprising:

a present switching node for a call dialed to a B-number, the present switching node generating, responsive to a redirection request for the call, a transfer-to C-number request including both the B-number and an origination point code for the present switching node;

a home location register storing transfer-to C-numbers for the dialed B-number and connected to receive the transfer-to C-number request from the present switching node, the home location register processing the B-number to retrieve a certain one of the C-numbers for call transfer, and processing the origination point code to determine an identification number for the present switching node, and generating a routing request, without having previously returned the C-number to the present switching node, including both the C-number and the identification number for the present switching node; and a serving switching node serving the certain C-number and having network connections with both the present switching node and the home location register, the serving switching node generating, in response to the routing request, a return signal for transmission to the present switching node identifying the serving switching node for transfer of the call to the C-number.

28. The network of claim 27 wherein the transfer-to C-number request comprises a signal including a parameter for the B-number.

29. The network of claim 27 wherein the present switching node comprises an originating switching node for the call.

30. The network of claim 27 wherein the present switching node comprises a switching node serving the dialed B-number.

31. The network of claim 27 wherein the redirection initiator comprises a redirection request transmitted responsive to failure of the call to the B-number.

32. A cellular telephone network, comprising:

a present switching node handling a call dialed to a B-number, the present switching node generating, responsive to a redirection request for the call, a transfer-to C-number request including an identification of both the B-number and the present switching node;

a first home location register storing transfer-to C-numbers for the dialed B-number and connected to receive the transfer-to C-number request from the present switching node, the home location register processing the B-number to retrieve a certain one of the C-numbers not assigned to the first home location register for call transfer, and processing the identification of the present switching node to determine an identification number for the present switching node;

a second home location register to which the certain C-number is assigned, the second home location register receiving a signal from the first home location register containing the C-number and the determined identification number for the present switching node, and generating a routing request including both the C-number and the identification number for the present switching node; and a serving switching node serving the certain C-number and having network connections with both the present switching node and the first and second home location registers, the serving switching node generating, in response to the routing request, a return signal for transmission to the present switching node identifying the serving switching node for transfer of the call to the C-number.

33. The network of claim 32 wherein the transfer-to C-number request comprises a signal including an origination point code for the present switching node and a parameter for the B-number.

34. The network as in claim 33 wherein the first home location register further includes means for mapping the origination point code to its associated present switching node identification number.

35. The network of claim 32 wherein the transfer-to C-number request comprises a signal including parameters for the originating switching node identification number as well as the B-number.

36. The network of claim 32 wherein the present switching node comprises an originating switching node for the call.

37. The network of claim 32 wherein the present switching node comprises a switching node serving the dialed B-number.

38. The network of claim 32 wherein the redirection initiator comprises a redirection request transmitted responsive to failure of the call to the B-number.

39. The network of claim 32 wherein the first home location register includes means for identifying the retrieved certain C-number as being assigned to the second home location register for transmission of the signal.

* * * * *